(12) United States Patent
Hubsch

(10) Patent No.: US 12,016,318 B1
(45) Date of Patent: Jun. 25, 2024

(54) FISHING HOOK WITH SPRING LOADED GAP CLOSURE

(71) Applicant: Matthias Hubsch, Hollywood, FL (US)

(72) Inventor: Matthias Hubsch, Hollywood, FL (US)

( * ) Notice: Subject to any disclaimer, the term of this patent is extended or adjusted under 35 U.S.C. 154(b) by 97 days.

(21) Appl. No.: 17/520,483

(22) Filed: Nov. 5, 2021

Related U.S. Application Data

(60) Provisional application No. 63/235,596, filed on Aug. 20, 2021.

(51) Int. Cl.
*A01K 83/06* (2006.01)

(52) U.S. Cl.
CPC .................................. *A01K 83/06* (2013.01)

(58) Field of Classification Search
CPC ...... A01K 83/06; A01K 83/00; A01K 83/061; A01K 83/063; A01K 83/064; A01K 83/066; A01K 83/067; A01K 83/069; A01K 83/04; A01K 85/02; A01K 85/022; A01K 85/025; A01K 85/026
USPC ...... 43/43.6, 5, 43.16, 42.43, 34, 43.2, 43.4, 43/44.2, 44.8
See application file for complete search history.

(56) References Cited

U.S. PATENT DOCUMENTS

| | | | | | |
|---|---|---|---|---|---|
| 4,670 | A | * | 7/1846 | Engelbrecht | A01K 83/04 24/599.6 |
| 5,255 | A | * | 8/1847 | Pendleton | A01K 83/02 43/34 |
| 5,709 | A | * | 8/1848 | Ellis | A01K 83/02 43/34 |
| 191,165 | A | * | 5/1877 | Miller | A01K 83/02 43/34 |
| 740,775 | A | * | 10/1903 | Pardon | A01K 83/02 43/34 |
| 839,611 | A | * | 12/1906 | Martin | A01K 83/02 43/34 |
| 983,353 | A | * | 2/1911 | Doddridge | A01K 83/00 43/43.4 |
| 1,180,120 | A | * | 4/1916 | Evans | A01K 83/04 43/37 |
| 1,293,127 | A | * | 2/1919 | Lantz | A01K 83/02 43/37 |
| 1,399,648 | A | * | 12/1921 | Partello | A01K 83/00 43/37 |
| 1,608,631 | A | * | 11/1926 | Stevenson | A01K 83/04 43/37 |
| 1,869,293 | A | * | 7/1932 | Wolford | A01K 83/00 43/43.6 |
| 2,120,863 | A | * | 6/1938 | Johnson | A01K 83/04 43/37 |
| 2,531,995 | A | * | 11/1950 | Sweetman | A01K 83/00 43/44.8 |
| 2,629,959 | A | * | 2/1953 | Dalton | A01K 83/00 43/37 |
| 2,853,827 | A | * | 9/1958 | Schwarzer | A01K 83/00 43/43.4 |
| 2,924,482 | A | * | 2/1960 | Gibson | A01K 97/14 43/37 |

(Continued)

*Primary Examiner* — Monica L Perry
*Assistant Examiner* — Maria E Graber
(74) *Attorney, Agent, or Firm* — Plager Schack LLP; Mark H. Plager; Naomi Mann

(57) ABSTRACT

A fishing hook includes a closure arm held under spring tension and configured to enclose a hook gap within the hook when released from spring tension, to prevent a fish from becoming unhooked during retrieval.

9 Claims, 4 Drawing Sheets

(56) References Cited

U.S. PATENT DOCUMENTS

| | | | | |
|---|---|---|---|---|
| 3,497,988 | A * | 3/1970 | Childers | A01K 83/00 43/43.4 |
| 3,823,971 | A * | 7/1974 | Golden | A01K 97/14 294/19.3 |
| 4,148,512 | A * | 4/1979 | Pendlebury | A01K 97/14 294/26 |
| 4,570,373 | A * | 2/1986 | Brief | A01K 83/00 43/43.16 |
| 4,926,579 | A * | 5/1990 | Jimenez | A01K 85/00 43/57.1 |
| 5,513,464 | A * | 5/1996 | Hutchins | A01K 83/04 43/34 |
| 5,953,851 | A * | 9/1999 | Van Der Hoven | A01K 97/14 43/37 |
| 6,560,917 | B2 * | 5/2003 | Van Der Hoven | A01K 97/14 43/37 |
| D475,605 | S * | 6/2003 | Kelleghan | D8/356 |
| 2019/0133098 | A1 * | 5/2019 | Lee | A01K 83/06 |
| 2021/0084880 | A1 * | 3/2021 | Faust | A01K 91/10 |

* cited by examiner

FISHING HOOK WITH SPRING LOADED GAP CLOSURE

RELATED APPLICATION

This application claims benefit to U.S. Provisional Application No. 63/235,596 filed Aug. 20, 2021, which is incorporated by reference herein in its entirety.

BACKGROUND

The present disclosure relates generally to fishing hooks, and fishing hook systems and methods.

Conventional fishing hooks typically have an open gap within the hook, which enables a fish to unhook once caught. As such, there is a need for an improved system that addresses at least the above-mentioned limitation of the prior art.

SUMMARY

According to various embodiments, disclosed is a fishing hook comprising a spring activated closure arm configured to enclose a hook gap within the hook to prevent a fish from becoming unhooked during retrieval. In certain embodiments, the disclosed fishing hook may comprise a fishing hook body including a hook shank and a hook bend extending from a lower portion of the hook shank; and a closure arm coupled to the hook body, and configured to move from an open position to a closed position for enclosing a hook gap within the hook body, wherein the closure arm is held under spring tension in the open position, and springs to the closed position when released from spring tension, and wherein the weight of a fish caught within the fishing hook is configured to release the closure arm from spring tension.

In some embodiments, the closure arm is supported on a torsion spring, the torsion spring including a spring coil and a lower spring arm, wherein the closure arm extends from a first coil end of the spring coil, and the lower spring arm extends from a second coil end of the spring coil, wherein the closure arm and lower spring arm are configured to align at a first angle in the open position of the closure arm, and at a second angle which is smaller than the first angle in the closed position of the closure arm. In some further embodiments, the fishing hook may comprise a top spring holder and a lower spring holder, wherein the top spring holder is configured to hold the closure arm in the open position and under spring tension against the inner hook side of the hook body, wherein the lower spring holder is configured to hold the lower spring arm against the inner hook side of the hook body, below the top spring holder, wherein the lower spring holder is configured to permit the torsion spring to move downwards with respect to the hook body, wherein a downwards movement of the torsion spring with respect to the hook body releases the closure arm from the spring holder, and wherein release of the closure arm from the upper spring holder causes the closure arm to spring to the closed position to enclose the hook gap.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
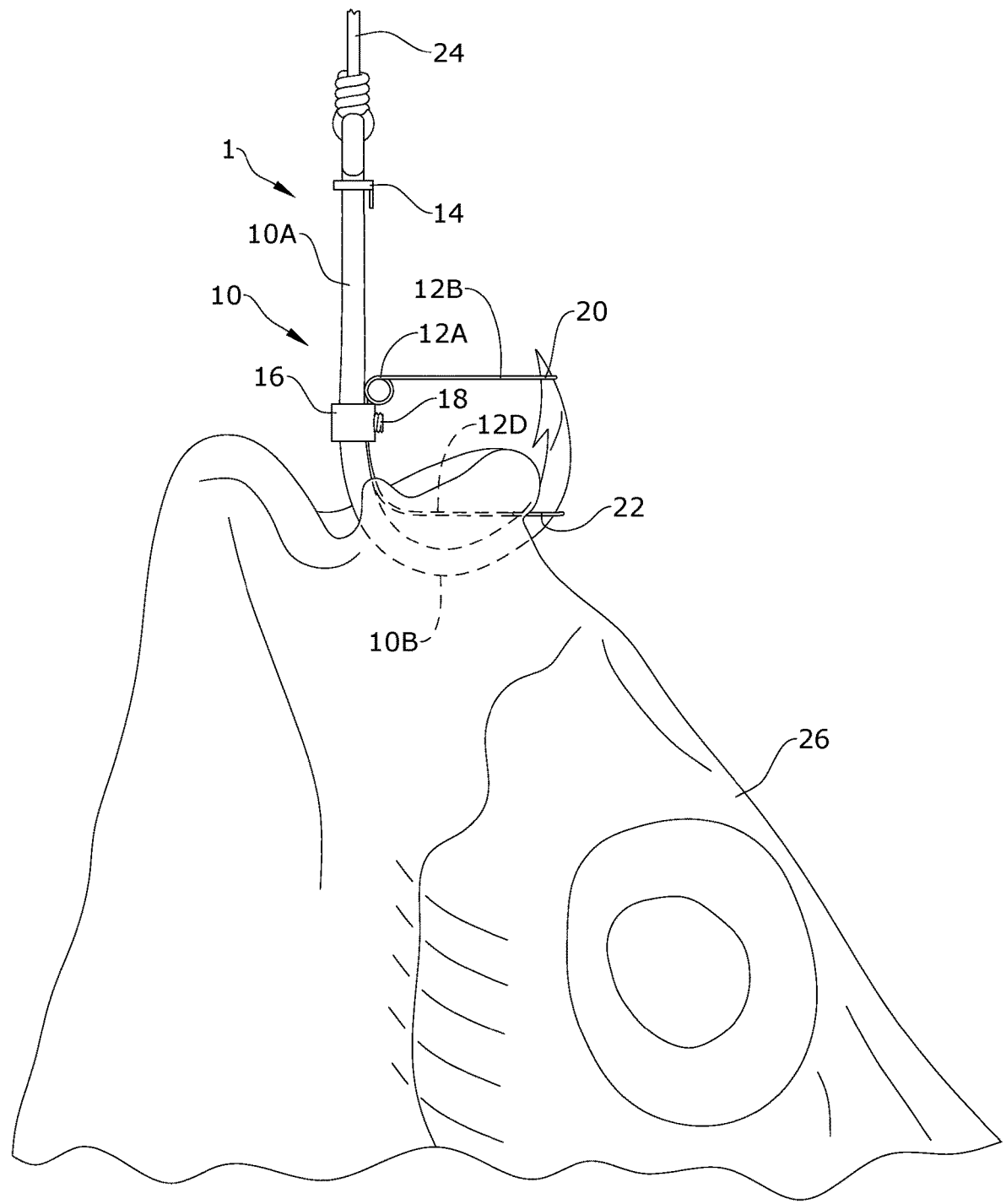
FIG. 1 depicts a fishing hook shown in use, and in accordance with certain embodiments.
Figure 2:
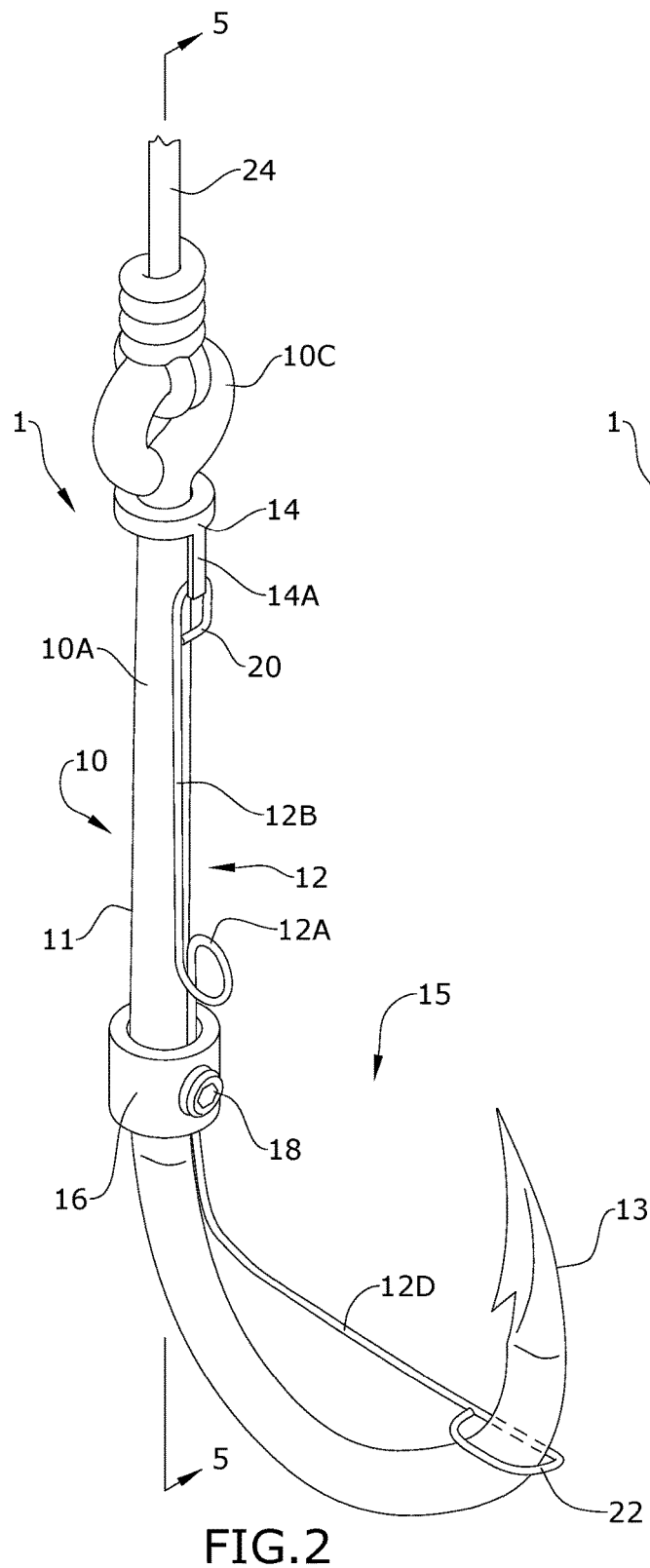
FIG. 2 is a perspective view of the fishing hook in an open position.
Figure 3:
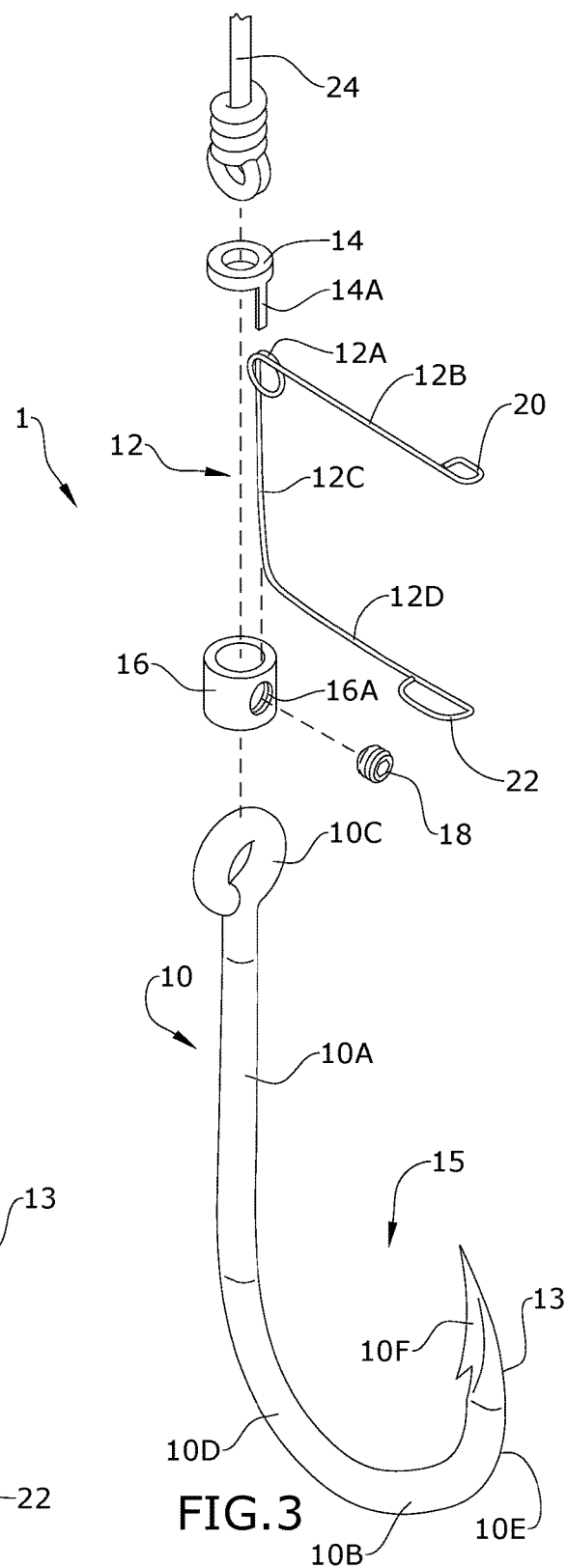
FIG. 3 is an exploded view of the fishing hook.

According to various embodiments as depicted in FIGS. 1-5, disclosed is a spring-loaded fishing hook 1, comprising a fishing hook body 10 and a closure arm 12B configured to move from an open position to a closed position under spring tension for enclosing a hook gap 15 within fishing hook body 10. In embodiments, closure arm 12B may be a component of a spring 12 which is coupled to hook body 10. Additionally, closure arm 12B may be held in the open position under spring tension, and snaps from the open position to the closed position upon its release from tension via a spring release mechanism in fishing hook 1. This provides a spring-loaded mechanism for enclosing hook gap 15 within fishing hook body 10 to prevent a caught fish 26 from escaping the hook.

In certain embodiments, hook body 10 of spring-loaded fishing hook 1 may generally comprise a hook shank 10A and a hook bend 10B extending from a lower portion of the hook shank. In some embodiments, hook body 10 may further comprise a connector 10C, such as a hook eye, extending from an upper side of hook shank 10A and configured to connectively engage to a fishing line 24.

Hook gap 15 may generally be defined as a space between an inner hook side 11 and an outer hook side 13 of hook body 10, and is at least partially within hook bend 10B. Inner hook side 11 may include hook shank 10A and an inner hook bend portion 10D of hook bend 10B which may extend generally downwards and outwards from hook shank 10A. Outer hook side 13 may include an outer hook bend portion 10E of hook bend 10B which may extend generally outwards and upwards from inner hook bend portion 10D of hook bend 10B. In some embodiments, outer hook side 13 may include a sharp and/or barbed end portion 10F for impaling and/or snagging fish 26.

In embodiments, spring 12 may be a torsion spring that is affixed to hook body 10, and supports closure arm 12B. In some embodiments, closure arm 12B may be held under spring tension via spring 12 (torsion spring 12) against hook body 10 in the open position (see FIGS. 2, 4A, 4B) and is configured to release from tension and snap to the closed position (see FIGS. 1 and 4C) to enclose hook gap 15 when fish 26 is caught within the fishing hook.

In embodiments, torsion spring 12 may comprise a spring coil 12A, wherein closure arm 12B may extend from a first coil end of spring coil 12A, forming a top spring arm of torsion spring 12. In certain embodiments, torsion spring 12 may further comprise a lower spring arm 12C extending from a second coil end of spring coil 12A, and a base arm 12D extending from a lower end of lower spring arm 12C. In some embodiments, closure arm 12B may be aligned at a first angle with respect to lower spring arm 12C in the open position, and at a second angle smaller than the first angle in the closed position. In certain embodiments, the first angle may be between approximately 135 degrees and approximately 180 degrees, and the second angle may be between approximately 80 degrees and approximately 100 degrees. As such, closure arm 12B may position substantially in line with lower spring arm 12C when loaded under spring tension (i.e., in the open position), and may snap into cross alignment with lower spring arm 12C when released from tension (i.e., in the closed position). Additionally, base arm 12D may be in cross alignment with lower spring arm 12C. In one embodiment, the angle between base arm 12D and lower spring arm 12C may be between approximately 80 degrees and 100 degrees. However, the specific alignment and cross angles may vary in alternate embodiments.

Figure 4A:
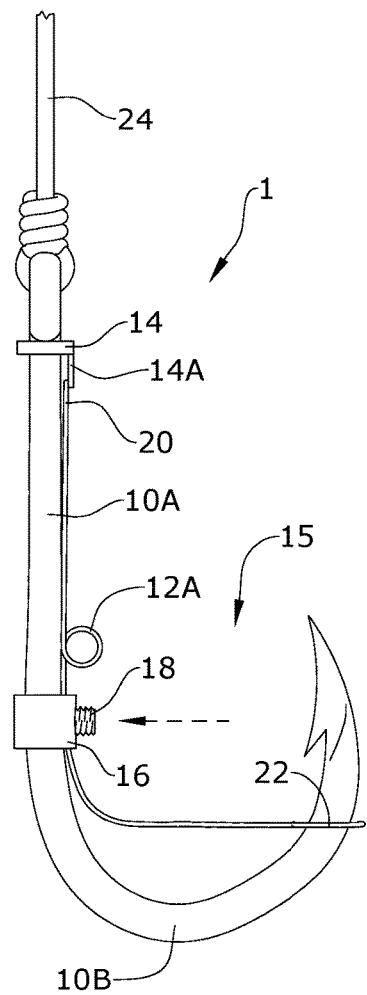
FIG. 4A is a front view of the fishing hook in the open position.
Figure 4B:
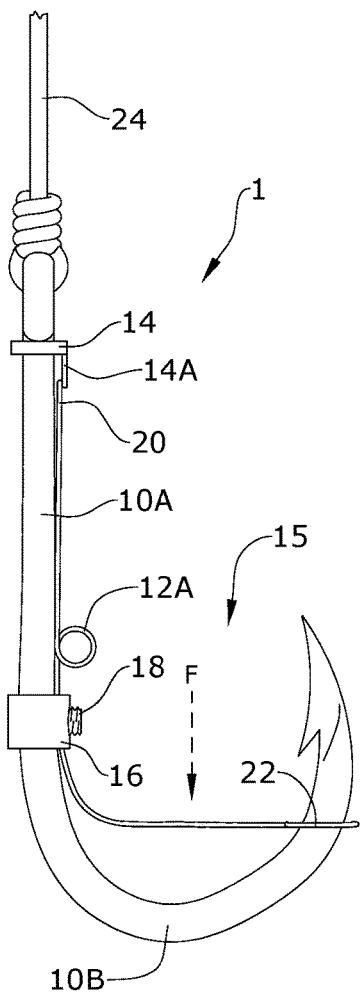
FIG. 4B is a front view of the fishing hook in the open position, illustrating application of a force for moving the hook to a closed position.
Figure 4C:
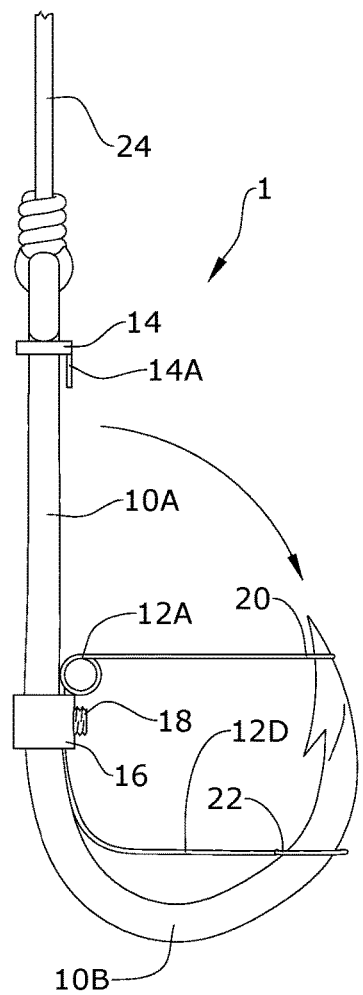
FIG. 4C is a front view of the fishing hook shown in the closed position.
Figure 5:
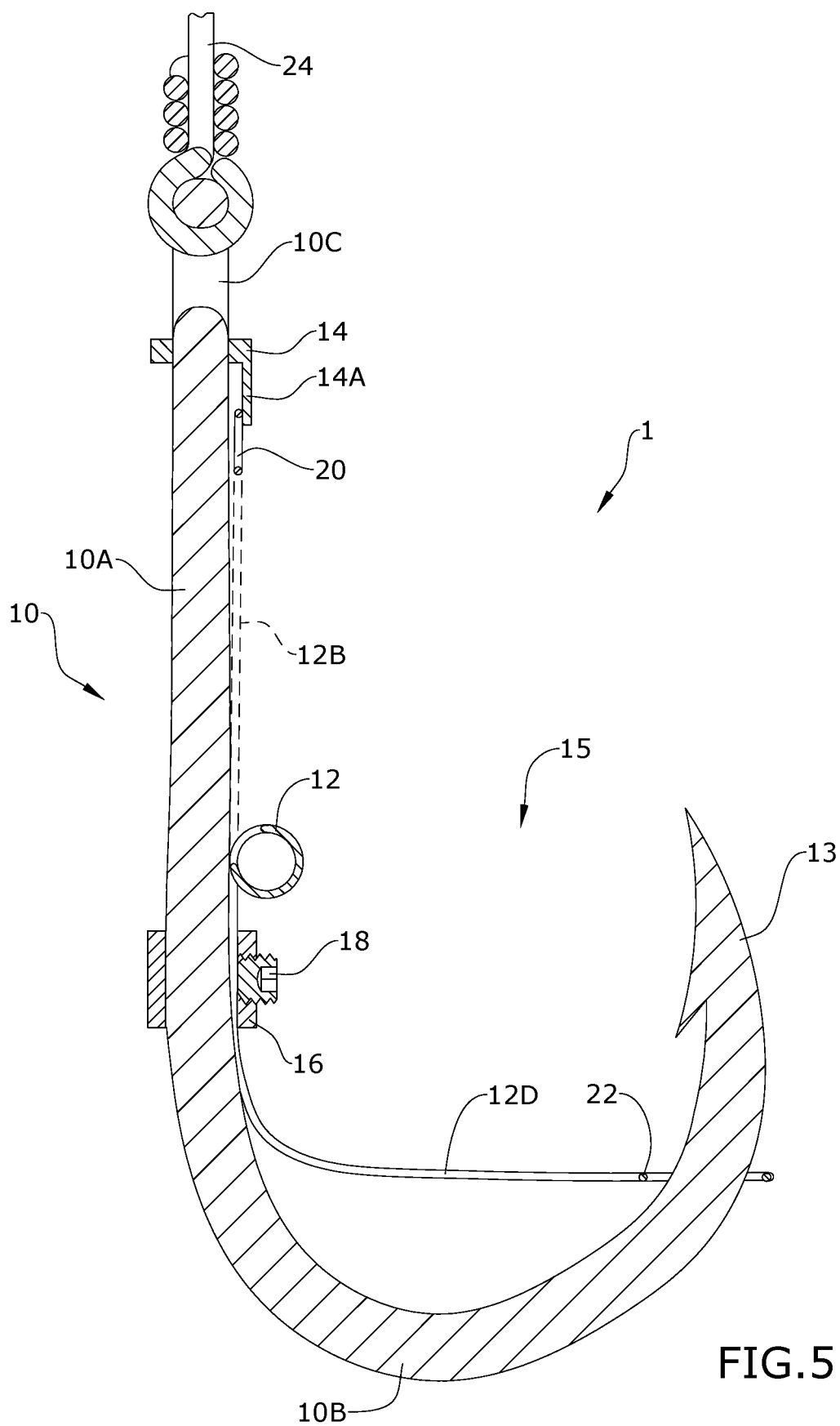
FIG. 5 is a section view taken along line 5-5 of FIG. 2.

In certain embodiments, spring 12 may be moveably coupled to hook body 10 via a lower spring holder 16. Additionally, closure arm 12B may be held under tension via a top spring holder 14, wherein release of closure arm 12B from top spring holder 14 causes closure arm 12B to spring towards outer hook side 13/outer hook bend portion 10E and to enclose gap 15. In embodiments, spring holder 14 may be coupled to hook body 10 at a top section of hook shank 10A and/or inner hook side 11 of hook body 10. As best depicted in FIG. 5, spring holder 14 may include a tab 14A, configured to capture closure arm 12B at a top portion 20 of the arm to prevent its outward movement and hold it in open position under spring tension induced by spring coil 12A. When spring 12 is moved or slid downwards with respect to hook shank 10A, closure arm 12B disengages from spring holder 14 and springs outwards whereby it encloses gap 15. In some embodiments, top portion 20 of closure arm 12B may comprise and/or be formed as a loop ("top spring loop 20"), said loop being configured to lasso around outer hook bend portion 10E and/or outer hook side 13 for securely enclosing gap 15, as depicted in FIGS. 1 and 4C.

In some embodiments, lower spring holder 16 may provide a collar which encircles lower spring arm 12C to hold spring 12 against hook shank 10A and/or inner hook side 11 of hook body 10. In some embodiments, lower spring holder 16 may include a tightening member 18 configured to adjust the tightness of the hold on lower spring arm 12C. This enables a user to adjust the force required to move or slide spring 12 downwards along hook body 10. In one embodiment, tightening member 18 may comprise a screw threaded through an aperture 16A within holder 16, and configured to press against lower spring arm 12C. As such, the normal force holding lower spring arm 12C against inner hook side 11/hook shank 10A may be adjusted by tightening or loosening tightening member 18, i.e., by twisting of the screw. It should be appreciated that in some embodiments, lower spring holder 16 may be attached to hook shank 10A/inner hook side 11 via an extraneous fastening mechanism (e.g., bolting, welding, etc.), while in other embodiments, tightening member 18 may be sufficient to maintain holder 16 in position.

In certain embodiments, base arm 12D may lay across inner hook side 11 and outer hook side 13 of hook body 10. In some embodiments, base arm 12D may further include an end loop 22 that wraps around outer hook side 13 and is configured to slide along outer hook side 13. Additionally, a clearance space is provided between base arm 12D and the bottom of hook bend 10B, enabling base arm 12D (along with the other components of spring 12) to move downwards in response to a force 'F' applied against base arm 12D, which may be caused by the weight or pressure of fish 26 caught within the hook. The downward movement of spring 12 causes closure arm 12B to be pulled out of top spring holder 14, and to snap into closed position, to enclose hook body 10 as shown in FIGS. 1 and 4C.

In embodiments, a user may adjust the force required to trigger spring 12 via tightening member 18. As such, spring 12 provides an adjustable trigger release mechanism for preventing fish 26 for escaping from spring-loaded fishing hook 1 once caught. As the hook's gap is closed after the bite of a fish, the fish will remain on the hook, increasing successful landings.

In one embodiment, closure arm 12B may extend at least a few millimeters into top spring holder 14, wherein base arm 12D may be configured to move a slightly greater distance downwards upon application of a downwards force. It should be appreciated that this distance, as well as the design configuration and dimensions of hook body 10 and torsion spring 12 may vary in alternate embodiments. It should be appreciated that the design configuration and size of spring 12 may vary depending on the design configuration and size of hook body 10.

The disclosed spring-loaded fishing hook may be used for any fishing application including recreational fishing, commercial fishing, ocean, or freshwater research projects, etc.

It shall be appreciated that spring-loaded fishing hook 1 and hook body 10 can have multiple configurations in different embodiments. For example, fishing hook 1 may be a barbless hook, a treble or double hook, bait, circular, and/or octopus hook, etc. It shall be appreciated that while spring coil 12A, closure arm 12B, lower spring arm 12C, and base arm 12D are depicted as integral components of spring 12, in alternate embodiments spring coil 12A, closure arm 12B, lower spring arm 12C, and/or base arm 12D may be separate components that are coupled to one another. It shall be appreciated that the components of fishing hook 1 described in several embodiments herein may comprise any alternative known materials in the field and be of any size and/or dimensions. In some embodiments, hook body 10 and torsion spring 12 may be manufactured from hardened steel but are not limited to this option. It shall be appreciated that the components of spring-loaded fishing hook 1 described herein may be manufactured and assembled using any known techniques in the field. Furthermore, the components of spring-loaded fishing hook 1 may be provided as an assembled and/or integral unit or may be provided as a kit/assembly of parts according to alternate embodiments.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A fishing hook comprising:
a fishing hook body including a hook shank and a hook bend extending from a lower portion of the hook shank; and
a closure arm coupled to said hook body, the closure arm configured to move from an open position to a closed position for enclosing a hook gap within the hook body, the hook gap being a space between an inner hook side and an outer hook side of hook body which is at least partially within the hook bend,
wherein the closure arm is held under spring tension in the open position, and springs to the closed position when released from said spring tension,
wherein the weight of a fish caught within the fishing hook is configured to release said closure arm from said spring tension,
 wherein the closure arm is supported on a torsion spring,
 the torsion spring including a spring coil and a lower spring arm,
wherein the closure arm extends from a first coil end of the spring coil, and the lower spring arm extends from a second coil end of the spring coil,
wherein the closure arm and lower spring arm are configured to align at a first angle in the open position of the closure arm, and at a second angle which is smaller than the first angle in the closed position of the closure arm,
the fishing hook further comprising a top spring holder and a lower spring holder,
wherein the top spring holder is configured to hold the closure arm in the open position and under spring tension against the inner hook side of the hook body,
wherein the lower spring holder is configured to hold the lower spring arm against the inner hook side of the hook body, below the top spring holder,
wherein the lower spring holder is configured to permit the torsion spring to move downwards with respect to the hook body,
wherein a downwards movement of the torsion spring with respect to the hook body releases the closure arm from the top spring holder, and
wherein release of the closure arm from the top spring holder causes the closure arm to spring to the closed position to enclose the hook gap within the hook body.

2. The fishing hook of claim 1, wherein a top portion of the closure arm includes a loop, said loop being configured to lasso around the hook bend at the outer hook side when the closure arm snaps into the closed position.

3. The fishing hook of claim 1, wherein the top spring holder comprises a tab configured to capture the closure arm at a top portion of the closure arm to prevent its outward movement under spring tension, and wherein a downwards movement of the closure arm disengages the closure arm from the top spring holder and allows it to spring to the closed position.

4. The fishing hook of claim 1, wherein the top spring holder is coupled to the hook body at a top section of the hook shank, and wherein the lower spring holder engages the hook body at a lower section of the hook shank.

5. The fishing hook of claim 1, further comprising a connector extending from an upper side of the hook shank and configured to connectively engage to a fishing line.

6. The fishing hook of claim 1, the torsion spring further comprising a base arm extending from a lower end of the lower spring arm and in cross alignment with the lower spring arm,
 the base arm configured to lay across the inner hook side and outer hook side of the hook body, and to leave a clearance space between the base arm and a bottom of the hook bend, enabling the base arm to move downwards in response to a force applied to the base arm,
 wherein a downwards movement of the base arm causes the downwards movement of the torsion spring and releases the closure arm from the top spring holder.

7. The fishing hook of claim 6, wherein the base arm includes an end loop configured to wrap around the hook bend at the outer hook side.

8. The fishing hook of claim 1, the lower spring holder including a tightening member configured to adjust a tightness of the hold on the lower spring arm against the inner hook side of the hook body.

9. The fishing hook of claim 8, wherein the lower spring holder comprises a collar configured to encircle the lower spring arm, and wherein the tightening member comprises a screw threaded through an aperture within the lower spring holder, wherein said tightness of the hold on the lower spring arm is adjustable via twisting of the screw.

* * * * *